US012578257B2

(12) United States Patent (10) Patent No.: US 12,578,257 B2
Pereira Arede (45) Date of Patent: Mar. 17, 2026

(54) DEVICE AND METHOD FOR DETECTING REACTIVE LUMINESCENT PARTICLES IN CARBON-BASED NANOMATERIALS

(71) Applicant: SPIN & TURN—CONSULTADORIA DE SOFTWARE, LDA, Gafanha Da Nazaré (PT)

(72) Inventor: João Paulo Pereira Arede, Aveiro (PT)

(73) Assignee: SPIN & TURN—CONSULTADORIA DE SOFTWARE, LDA, Gafanha da Nazaré (PT)

( * ) Notice: Subject to any disclaimer, the term of this patent is extended or adjusted under 35 U.S.C. 154(b) by 196 days.

(21) Appl. No.: 18/598,555

(22) Filed: Mar. 7, 2024

(65) Prior Publication Data

US 2025/0035533 A1 Jan. 30, 2025

(30) Foreign Application Priority Data

Mar. 7, 2023 (PT) .......................................... 118544

(51) Int. Cl.
*G01N 23/00* (2006.01)
*G01N 15/1429* (2024.01)
(52) U.S. Cl.
CPC ................................. *G01N 15/1429* (2013.01)
(58) Field of Classification Search
CPC .......................... G01N 21/6408; G01N 21/643
See application file for complete search history.

(56) References Cited

U.S. PATENT DOCUMENTS 4,259,574 A 3/1981 Carr et al.
4,618,257 A 10/1986 Bayne et al.
(Continued)

FOREIGN PATENT DOCUMENTS

DE 102017129986 A1 6/2019
EP 3605067 A1 2/2020
(Continued)

OTHER PUBLICATIONS

International Search Report in related International Patent Application No. PCT/IB2020/061141 dated Apr. 15, 2021. (5 pages).
(Continued)

*Primary Examiner* — Dani Fox
(74) *Attorney, Agent, or Firm* — Leason Ellis LLP

(57) ABSTRACT

Device and method for detecting reactive luminescent nano- or micro-particles embedded in a composite comprising a polymeric matrix with carbon-black or sulphur-black particles, or embedded in a sulphur-dyed substrate or surface, comprising: an infrared or ultraviolet illuminator for illuminating the luminescent particles; a near-infrared photodiode sensor for capturing a near-infrared response of the illuminated luminescent particles; a dark chamber for placing over the substrate or surface, inside which the illuminator and photodiode sensor are mounted; a logarithm amplifier for amplifying and linearizing a response signal captured by the photodiode sensor; an electronic data processor configured for detecting the reactive luminescent particles, by carrying out the steps of: illuminating the substrate or surface with the illuminator; acquiring the amplified linearized signal captured by the photodiode sensor; detecting the presence of luminescent particles in the composite or substrate or surface from the linearized decay of the acquired signal.

20 Claims, 6 Drawing Sheets

(56)     References Cited

U.S. PATENT DOCUMENTS

| | | | |
|---|---|---|---|
| 5,757,001 A | 5/1998 | Burns | |
| 2001/0033371 A1 | 10/2001 | Lawandy | |
| 2013/0048874 A1 | 2/2013 | Rapoport et al. | |
| 2021/0116370 A1 * | 4/2021 | Sato ........................ | G01J 1/02 |
| 2022/0397507 A1 | 12/2022 | Pereira Arede et al. | |

FOREIGN PATENT DOCUMENTS

| | | | |
|---|---|---|---|
| GB | 2095822 A | 10/1982 |
| KR | 101297702 B1 | 8/2013 |
| WO | 1989008224 A1 | 9/1989 |
| WO | 2018181134 A1 | 10/2018 |

OTHER PUBLICATIONS

Christopher M. Long, "Carbon black vs. black carbon and other airborne materials containing elemental carbon: Physical and chemical distinctions", Environmental Pollution, Jun. 2013, pp. 271-286.

* cited by examiner

DEVICE AND METHOD FOR DETECTING REACTIVE LUMINESCENT PARTICLES IN CARBON-BASED NANOMATERIALS

CROSS-REFERENCE

This application claims the benefit of priority under 35 U.S.C. § 119 (e) from Portugal Patent Application No. 118544, filed on Mar. 7, 2023, which is hereby incorporated by reference as if set forth in its entirety herein.

TECHNICAL FIELD

The present disclosure relates to a device and method for detecting reactive luminescent particles in carbon-based nanomaterials embedded in a composite comprising a polymeric matrix with carbon-black or sulphur-black particles, or embedded in a sulphur-dyed substrate or surface.

BACKGROUND

Small LNP's (Luminescent Nano-particles) of 5 microns or less react when illuminated with an infra-red source of light. The reaction is reflective energy on different wavelengths and usually observed and examined using a spectrometer reader. These LNP's are usually mixed with different materials, called "substrates" and are used for many applications namely as part of an anti-counterfeit solution.

A very well known anti-counterfeit technique using this kind of solution, for example, is in regard to banknotes which use IR ink properties, as well as other technologies. The amount of LNP's used is minute, making the detection an extremely difficult task and usually only possible under laboratory and/or in controlled environment. The motivation of this invention is to create an apparatus for users to evaluate materials giving the opportunity to detect the presence of LNP's, identifying and quantifying, at very low concentrations, and checking its veracity. Concentrations can be down to 1 ppm (or less) and in dark substrates where most of light is absorbed by its material making it very difficult to detect LNPs and where others apparatus fails due lack of sensitivity.

Patent document WO1989008224A1 discloses a luminescent fiber marker and method comprised of a linear coaxial lens having an elongated thin cylindrical phosphorescent layer and a pair of colinear and coaxial optical waveguides sandwiching the thin cylindrical phosphorescent layer therebetween so that light impinging on said cylindrical phosphorescent layer along the length thereof is induced to store said radiation energy in said light and emit radiation of a different wavelength from the light impinging on said cylindrical phosphorescent layer into both of said optical waveguides. Each of said optical waveguides has a fluorescent material dispersed therein for absorbing the emitted radiation from said phosphorescent layer reemitting the absorbed radiation to affect an internal scatter of radiation in each of said waveguides to permit trapping within the waveguide cores. At least one of the ends of the pair of colinear and coaxial waveguides is adapted to emit said light of a different wavelength, the ends may be arranged in various patterns and/or have diffuser or mirrors associated therewith. These facts are disclosed in order to illustrate the technical problem addressed by the present disclosure.

SUMMARY OF THE DISCLOSURE

The present disclosure relates to a device and method for detecting, identifying and quantifying, DIQ, reactive luminescent particles embedded in a composite or substrate or surface based in carbon nanomaterials comprising: an infra-red or ultraviolet illuminator for illuminating the luminescent particles; a near-infrared photodiode sensor for capturing a near-infrared response of the illuminated luminescent particles; a dark chamber for placing over the substrate or surface, inside which the illuminator and photodiode sensor are mounted; a logarithm amplifier for amplifying and linearizing a signal captured by the photodiode sensor; an electronic data processor (e.g., a hardware processor) configured for DIQ the reactive luminescent particles, by carrying out the steps of: illuminating the composite or substrate or surface with the illuminator; acquiring the amplified linearized signal captured by the photodiode sensor; detecting the presence of luminescent particles in the composite or substrate or surface from the linearized decay of the acquired signal.

The present disclosure aims to detect a variety of infrared (IR) or ultraviolet (UV) Luminescent Nano-particles (LNP) when receiving energy with wavelengths near 940 nm are reacting and transmitting energy back over 980 nm wavebands. Under laboratory conditions, isolated LNPs with high concentrations, (more than 400 ppm), is quite easy to detect and recognised. Reducing concentrations down to 10 ppm keeping all the abilities of detection and recognition is desire to reduce costs on the use of LNPs. One of the motivations of present implementation is to have a small apparatus, portable and manageable with most of features found on laboratory equipment.

In real-life applications, the colour of carbon-based or sulphur-based surfaces or substrates creates further barriers for detection, putting boundaries on unsustainable levels of LNPs use is said substrates or surfaces. Black and dark colours using carbon-based or sulphur-dyed nanomaterials are the worst cases where most of light from LNPs emissions is absorbed by substrates. Simply increasing the power of incident light and increasing and/or increasing the sensitivity of the light sensor will not solve this problem in a straightforward way.

Carbon-based nanomaterials include carbon nanotubes, fullerenes and graphite (or graphene, one layer of graphite); all are carbon atomic structures in different forms. Another carbon-based nanomaterial is carbon black (CB) consisting of a fine black powder of nearly pure elemental carbon. CB can be obtained by thermal decomposition of gaseous of liquid hydrocarbons under controlled conditions. Products containing CB include inks, paints, plastics and coatings. There are still carbon-based materials resulting from incomplete combustion of fossil fuels and biomass, sometimes called soot, or in some articles also called Black Carbon, which can also present a strong light absorption.

Strong light absorption is particularly present in substrates based in natural fibres, and man-made fibres, with an applied sulphur black dye. The present disclosure includes DIQ of LNPs in combination of sulphur dyeing materials like sodium sulphide.

The disclosure also includes DIQ in same group which includes sulphur black results from industrial processes, like vulcanization, where raw materials suffer changes due to high temperature and pressures, for example present in vulcanized rubber.

DIQ of LNPs in these carbon or sulphur containing substrates or surfaces are prone to interference primarily stemming from the high light absorption of carbon or sulphur containing substrates or surfaces, especially carbon-black or sulphur-black, a well-known thermo-optical effect. Additionally, there are other interference effects due to the impurities in carbon black, which lead to multiple scattering and consequently affect the measurements.

Furthermore, carbon black, or the other carbon or sulphur containing substrates or surfaces, find applications across various industries, such as paper production, where its chemical interactions with cellulose differ from those with other materials. Localized nanoparticle interactions vary significantly across these diverse environments, leading to distinct luminescent reactions in each application.

Taking carbon black as an example, of course not all emitted light is absorbed by carbon black, allowing localized nanoparticles the opportunity to react and reflect light (despite high absorption by carbon black). Achieving a balance between emitted and received light is crucial for ensuring the precision of processes and obtaining accurate LNP measurements. As discussed, the received light is exceedingly weak. Hence, the used conversion devices and techniques employed to convert light into electrical signals are of importance in ensuring a high signal-to-noise ratio. Furthermore, the quenching effect of localized nanoparticles poses a significant challenge. Despite the consistent absorption of light by CB, the signal diminishes over time. In the time domain, the light emission from localized nanoparticle excitation cannot be excessively strong due to obfuscation of the detection receiver. However, the light emission from localized nanoparticle excitation must be sufficiently robust to overcome the absorption by carbon black. As a result of the quenching effect, the light intensity gradually decreases over time, rendering it impossible to measure carbon black after a certain period has passed. Considering both obfuscation and quenching effects, the time window for successful measurement becomes exceedingly narrow. Surprisingly, however, the inventors have discovered that the impediments to detecting LNPs in such materials are avoided by the presently disclosed devices and methods, enabling those materials to be employed without compromising the signal to noise ratio such that LNP particles can be detected. In part, the inventors have recognized that fine tuning the time-domain capture of light to start after the receiver obfuscation has subsided or passed, and is performed before the signal is quenched by the material under observation, defines a window during which LNP detection can be successfully performed with the absorptive materials considered here, including, without limitation, polymeric matrices comprising carbon black particles, sulphur-black particles, other carbon or sulphur containing substrates or surfaces, and particles embedded in a sulphur-dyed substrate or surface.

Typically, time-domain capture of light is arranged to start when the receiver signal is below a predetermined saturation signal level. Alternatively, the time lapsed until receiver signal is below a saturation level can be measured and that measured time can be used as a predetermined time period after which measurement can be done. Typically, the start of the time-domain capture of light is preferably from 1.2 milliseconds (ms) to 3.5 ms after the infrared (IR) or ultraviolet (UV) illuminator has started illuminating a sample, more preferably from 1.9 ms to 3 ms after the infrared (IR) or ultraviolet (UV) illuminator has started illuminating a sample.

Typically, time-domain capture of light is arranged to end when the receiver signal is below a predetermined detection level. Alternatively, the time lapsed until receiver signal is below a detection level can be measured and that measured time can be used as a predetermined time period until which measurement can be done. Typically, the end of the time-domain capture of light is preferably from 1.8 milliseconds (ms) to 3.9 ms after the infrared (IR) or ultraviolet (UV) illuminator has started illuminating a sample, more preferably from 2.3 ms to 3.4 ms after the infrared (IR) or ultraviolet (UV) illuminator has started illuminating a sample.

The skilled person will appreciate that these timings are typical timings, which may need to be adapted to the specific illuminator being used and/or the specific receiver being used. The skilled person will also appreciate that these typical timings may need to be adapted to the specific polymeric matrix with carbon-black or sulphur-black particles, or adapted to the sulphur-dyed substrate or surface.

It is disclosed a purpose embodiment of a small portable enclosure with a bottom rip to light pass through to a cavity wherein the use of light emitter and light sensor are located inside. The disposal of light emitter and light sensor are in such way as to reduce losses and to have maximum incident energy over observed surface or substrate. Use of SMT devices as light emitters and light sensors, LEDs and photodiodes respectively, simplifies the implementation, since, once by reducing the degrees of freedom of one dimension the alignment is only possible by using the remaining two dimensions.

In an embodiment, the IR or UV illuminators light intensity are controlled by a drive based on a controlled constant current power supply.

In an embodiment, the apparatus tunes light intensity for a given substrate by varying DAC value.

In an embodiment, all independent signals from all photodiodes, digital converted, can be combined; wherein said combined are mathematical operations of digital signals: addition, subtraction, multiplications or combinations thereof.

In an embodiment, these mathematical operations are used for identification and quantification of reactive luminescent nano-particles.

In an embodiment, in all photodiodes is used independent logarithm amplifiers circuits a second stage of a linear amplification.

In an embodiment, these additional second stage of amplification connects to an independent ADC input channel.

In an embodiment, these additional second stage of amplification is used for identification and quantification of very low concentrations of reactive luminescent nano-particles.

In an embodiment, the substrate is a textile, a leather, a wood, a paper, a plastic, a metal, or combinations thereof.

In an embodiment, one or more IR illuminators are LED IR illuminators or Laser IR illuminators.

In an embodiment, one or more UV illuminators are LED UV illuminators or Laser UV illuminators.

Disclosed is an embodiment for a device for detecting reactive luminescent nano- or micro-particles embedded in a composite comprising a polymeric matrix with carbon-black or sulphur-black particles, or embedded in a sulphur-dyed substrate or surface, comprising: an infrared or ultraviolet illuminator for illuminating the luminescent particles; a near-infrared photodiode sensor for capturing a near-infrared response of the illuminated luminescent particles; a dark chamber for placing over the substrate or surface, inside which the illuminator and photodiode sensor are mounted; a logarithm amplifier for amplifying and linearizing a response signal captured by the photodiode sensor; an electronic data processor (e.g., a hardware processor) configured by code executing therein for detecting the reactive luminescent particles, by carrying out the steps of: illuminating the composite or substrate or surface with the illuminator; acquiring the amplified linearized signal captured by the photodiode sensor; detecting the presence of the luminescent particles in the composite or substrate or surface from the linearized decay of the acquired signal. As noted previously, capture at the photodiode sensor in the time-domain from such a material as noted here is arranged to start after the receiver obfuscation has subsided or passed, and is arranged to be performed before the signal is quenched by the material under observation.

It is also disclosed a computer-based method for detecting reactive luminescent nano- or micro-particles embedded in a composite comprising a polymeric matrix with carbon-black or sulphur-black particles, or embedded in a sulphur-dyed substrate or surface, using a device, comprising the steps of: illuminating the composite or substrate or surface with an infrared or ultraviolet illuminator for illuminating the luminescent particles; capturing a near-infrared response of the illuminated luminescent nano-particles with a near-infrared photodiode sensor, wherein the illuminator and photodiode sensor are mounted inside a dark chamber placed over the substrate or surface; amplifying and linearizing a response signal captured by the photodiode sensor with a logarithm amplifier; acquiring the amplified linearized signal captured by the photodiode sensor; carrying out by an electronic data processor configured by code executing therein for detecting the presence of the luminescent particles in the composite or substrate or surface from the linearized decay of the acquired signal. In some implementations, the detecting step when working with such materials from starts after the receiver obfuscation has subsided or passed, and is performed before the signal is quenched by the material under observation.

The chamber is useful for creating a space for particles to be luminescent when receiving IR or UV illumination.

In an embodiment, said device comprises a further near-infrared photodiode sensor with a different spectral sensitivity response from the first photodiode sensor, a further logarithm amplifier for amplifying and linearizing a signal received by the further photodiode sensor, and a differentiator for obtaining a difference between amplified signals received by each photodiode sensor.

In an embodiment, the electronic data processor is configured for detecting peaks in a time-domain signal of said difference above a predetermined threshold.

In an embodiment, the electronic data processor is configured for distinguishing between luminescent particles having a different spectral response from the detected peaks.

In an embodiment, said device comprises a linear amplifier for further amplifying the amplified linearized signal captured by each photodiode sensor.

In an embodiment, the luminescent particles are reactive with wavelengths of 750-2500 nm, in particular of 750-1100 nm.

In an embodiment, the IR illuminator is a LED IR illuminator or laser IR illuminator.

In an embodiment, the UV illuminator is a LED UV illuminator or laser UV illuminator.

In an embodiment, the substrate is a textile substrate, a paper substrate, a plastic substrate, a metal substrate, a cork substrate, a wood substrate, a leather substrate, a fur substrate or combinations thereof.

In an embodiment, the logarithm amplifier is an OP-AMP logarithm amplifier.

In an embodiment, the reactive luminescent nano- or micro-particles comprise a core of rare earth ceramic material selected from a group of $La^+$; $Ce3^+$, $Pr3^+$, $Nd3^+$; $Pm3^+$, $Sm3^+$, $Eu3^+$, $Gd3^+$, $Tb3^+$, $Dy3^+$, $Ho3^+$, $Er3^+$, $Tm3^+$, $Yb3^+$, $Lu3^+$, or combinations thereof.

In an embodiment, the reactive luminescent nano- or micro-particles having a particle size between 10 nm to 25 μm, in particular of 20-20 μm.

In an embodiment, the method further comprising the steps of: amplifying and linearizing, by a further logarithm amplifier, a signal received by a further near-infrared photodiode sensor with a different spectral sensitivity response from the first photodiode sensor; obtaining a difference, by a differentiator, between amplified signals received by each photodiode sensor.

In an embodiment, the method further comprising the steps of: detecting peaks in a time-domain signal of said difference above a predetermined threshold.

In an embodiment, the method further comprising the steps of: distinguishing between luminescent particles having a different spectral response from the detected peaks.

In an embodiment, the luminescent nano-particles can be reactive with wavelengths of 750-2500 nm, in particular of 750-1100 nm.

In an embodiment, the method comprises the substrate that can be a textile substrate, a paper substrate, a plastic substrate, a metal substrate, a cork substrate, a wood substrate, a leather substrate, a fur substrate or combinations thereof.

In an embodiment, the method comprises the substrate that can be the reactive luminescent nano- or micro-particles comprise a core of rare earth ceramic material selected from a group of $La3^+$; $Ce3^+$, $Pr3^+$, $Nd3^+$; $Pm3^+$, $Sm3^+$, $Eu3^+$, $Gd3^+$, $Tb3^+$, $Dy3^+$, $Ho3^+$, $Er3^+$, $Tm3^+$, $Yb3^+$, $Lu3^+$, or combinations thereof.

It is also disclosed a non-transitory storage medium including program instructions for implementing a computer-based method for detecting a reactive luminescent nano-particles embedded in a composite comprising a polymeric matrix with carbon-black or sulphur-black particles, or embedded in a sulphur-dyed substrate or surface, the program instructions including instructions executable by a data processor to carry out any of the disclosed methods.

REFERENCES

[1]-Christopher M. Long, 2013, Carbon black vs. black carbon and other airborne materials containing elemental carbon: Physical and chemical distinctions.

BRIEF DESCRIPTION OF THE DRAWINGS

The following figures provide preferred embodiments for illustrating the disclosure and should not be seen as limiting the scope of invention.

DETAILED DESCRIPTION

Figure 1:
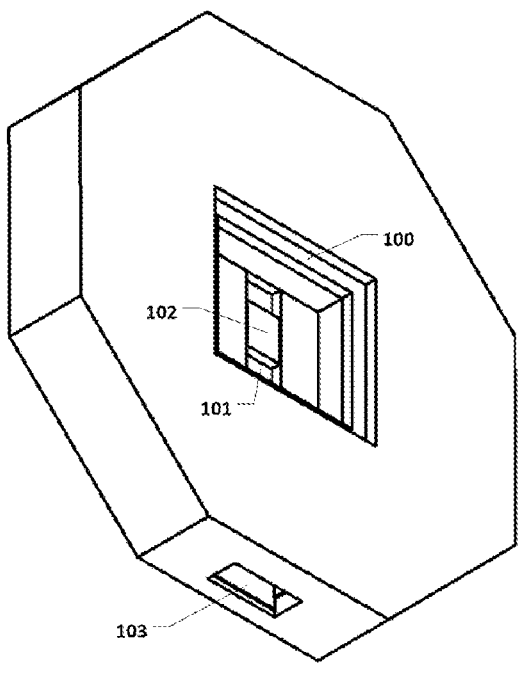
FIG. 1: Schematic representation of an embodiment of the device.

FIG. 1 shows a schematic representation of an embodiment of enclosure, bottom view, where rip 100 is used to allow light passing from emitters 101 to substrate where is reflected and back into photodiode sensor 102. Lateral opening is used by a USB 103 cable connection to power supply apparatus and for communication purposes.

Figure 2:
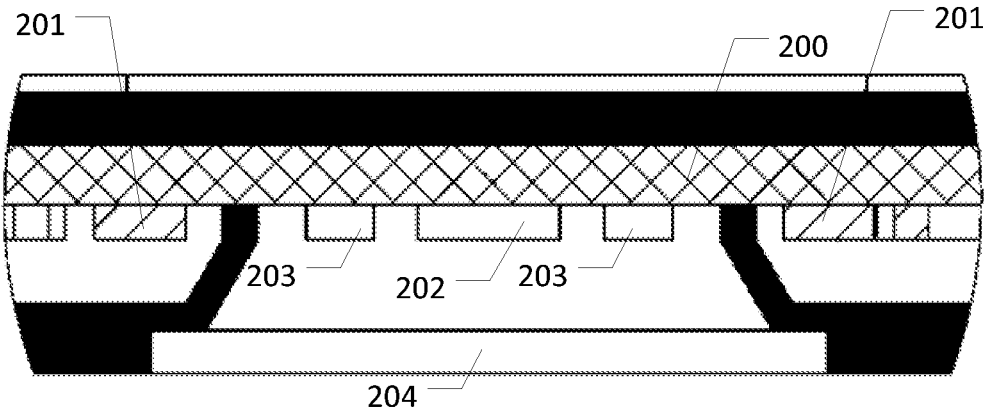
FIG. 2: Schematic representation of an embodiment of the detailed transversal cut of enclosure.

FIG. 2 shows a detailed transversal representation of a cut of enclosure where it can be seen PCB 200 with upside down SMT components 201, in center photodiode sensor 202 and side by side the two light emitters 203. On bottom an acrylic glass 204 to protect from dust and used on this embodiment as visible light cut filter.

Figure 3:
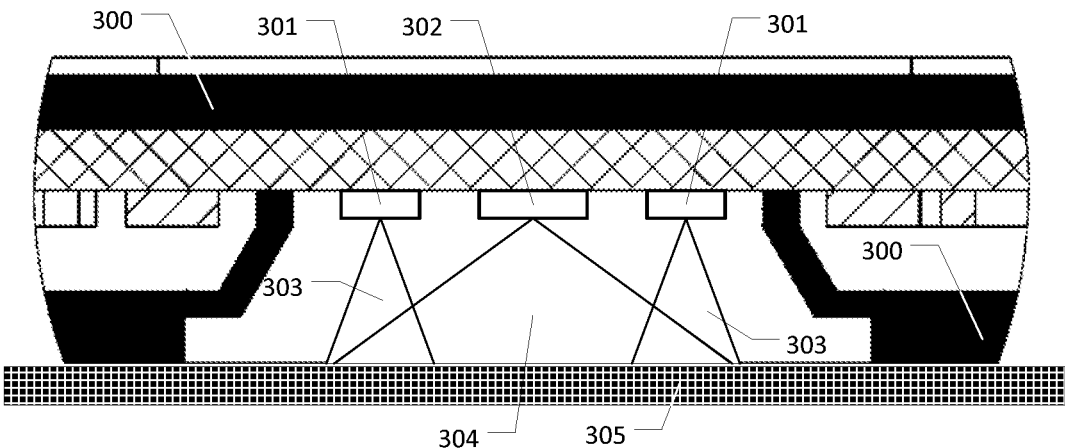
FIG. 3: Schematic representation of an embodiment of the detailed transversal cut of enclosure.

FIG. 3 shows a detailed transversal cut of enclosure 300 where it can be seen upside down SMT emitters 301 and photodiode sensor 302 with respective light angles scheme, incidence 303 and return 304 over and from the substrate 305.

Figure 4:
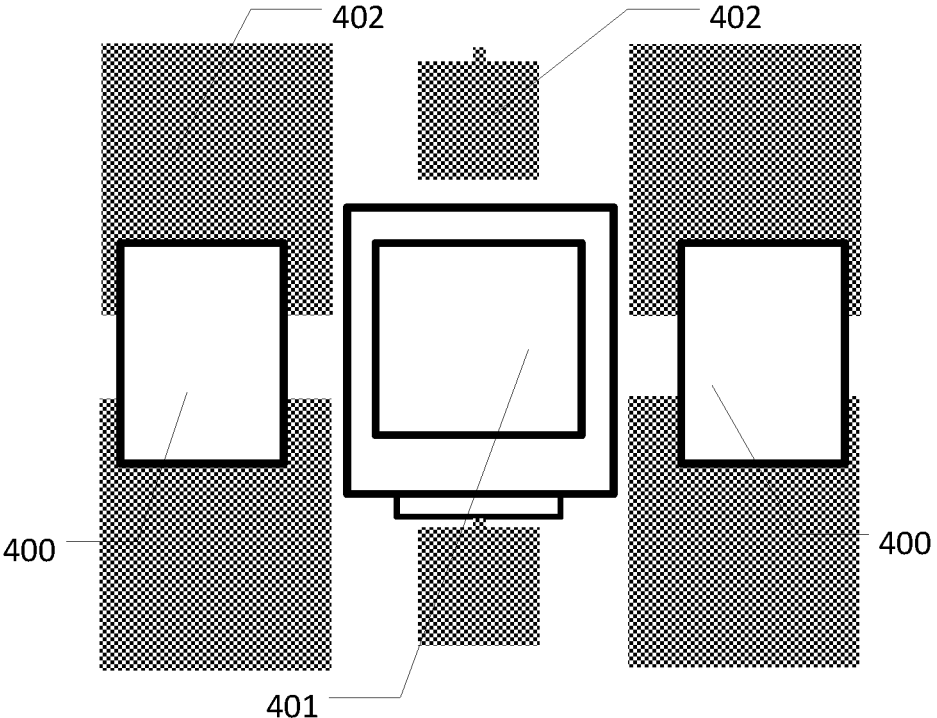
FIG. 4: Schematic representation of an embodiment of the PCB layout for two LED placed side by side of photodiode sensor; the gray squares are SMT solder pads.

FIG. 4 shows a schematic representation of an embodiment PCB layout for two LED 400 placed side by side of photodiode sensor 401; the gray squares are SMT solder pads 402.

Figure 5:
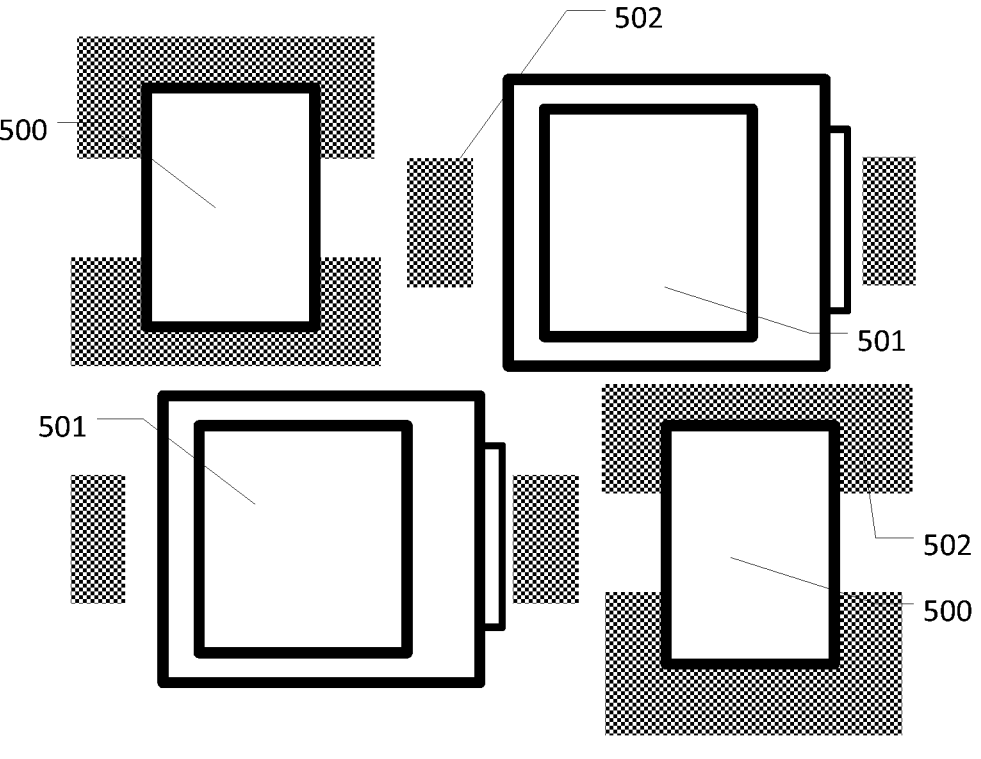
FIG. 5: Schematic representation of an embodiment for a PCB layout for two SMT LED and two SMT photodiodes sensors.

FIG. 5 shows a schematic representation of an embodiment preferable for a PCB layout for two SMT LED 500 and two SMT photodiodes sensors 501; the gray forms are SMT solder pads 502.

Figure 6:
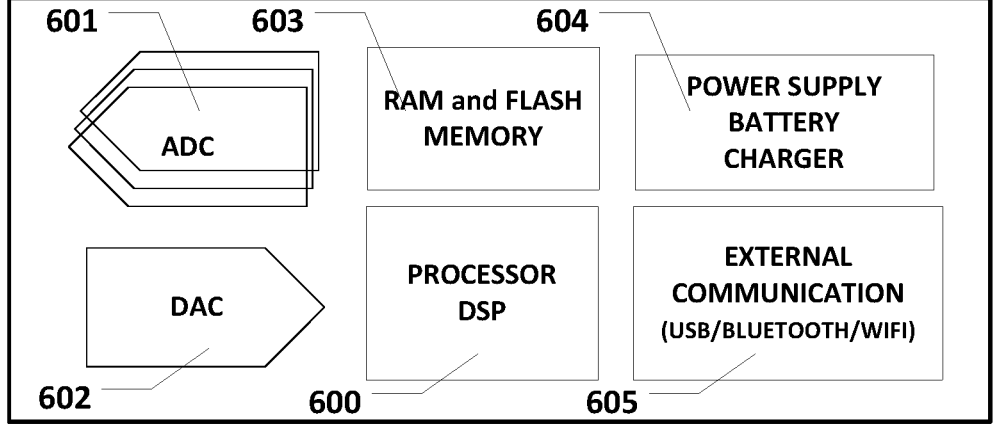
FIG. 6: Schematic representation of an embodiment of the block diagram of modules microcontroller divided by main functionalities.

FIG. 6 shows a block diagram of modules microcontroller divided by main functionalities (processor with DSP instructions 600, ADC 601 with different input channels, DAC 602, RAM and flash memory 603, power supply with battery and battery charger circuit 604, several external communication possibilities 605 such as USB, Bluetooth, WiFi among other possibilities).

Figure 7:
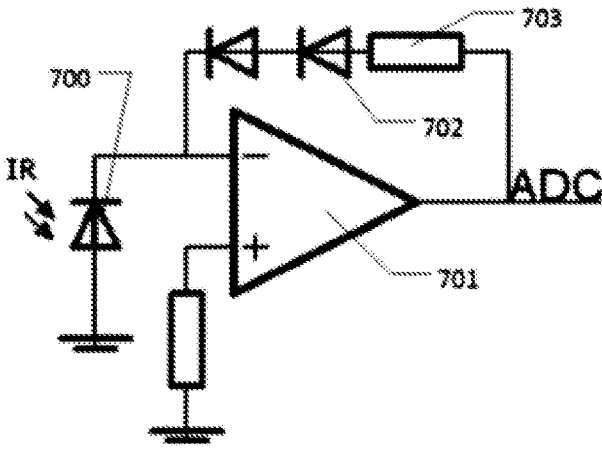
FIG. 7: Schematic representation of an embodiment of the circuit of photodiode with logarithm OP-AMP made by loop gain diodes and resistor.

FIG. 7 shows a detailed circuit of photodiode 700 with logarithm OP-AMP 701 made by loop gain diodes 702 and resistor 703.

Figure 8:
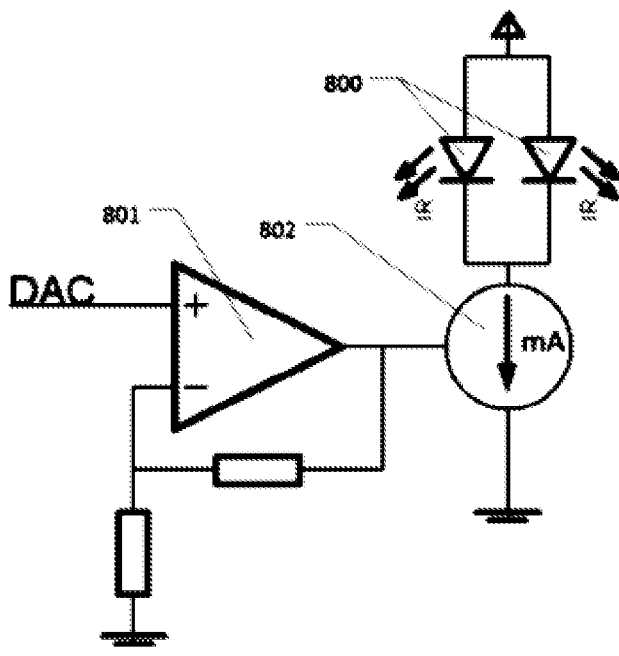
FIG. 8: Schematic representation of an embodiment of the drive circuit for IR or UV LEDs, controlled by DAC signal with OP-AMP and constant current power source.

FIG. 8 shows a drive circuit for IR or UV LEDs 800, controlled by DAC signal with OP-AMP 801 and constant current power source 802.

Figure 9:
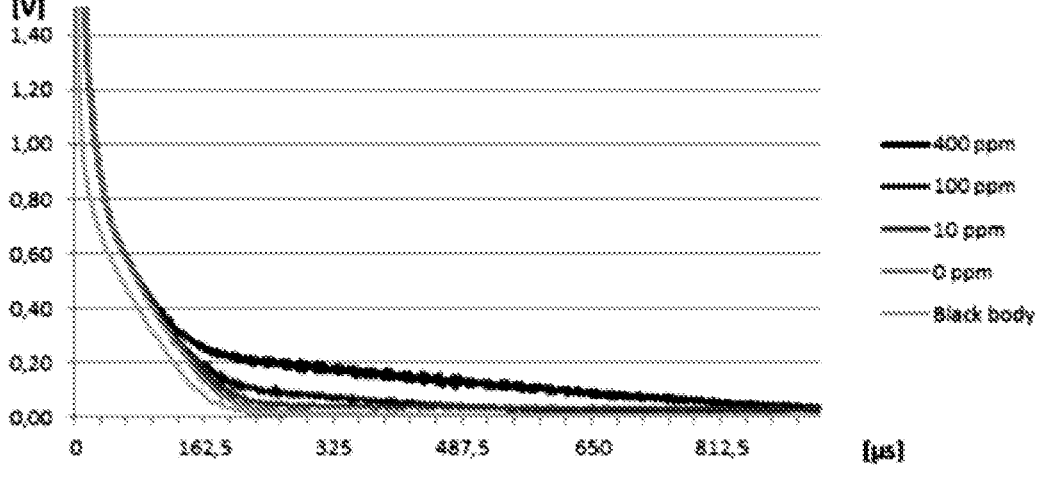
FIG. 9: Illustration of results from embodiment with one photodiode sensor for a given substrate where LNPs are present with 400 ppm, 100 ppm, 10 ppm, no LNPs and black body.

FIG. 9 shows the results got from embodiment with one photodiode sensor for a given substrate where LNPs are present with 400 ppm, 100 ppm, 10 ppm, no LNPs and black body (only apparatus reflections).

Figure 10:
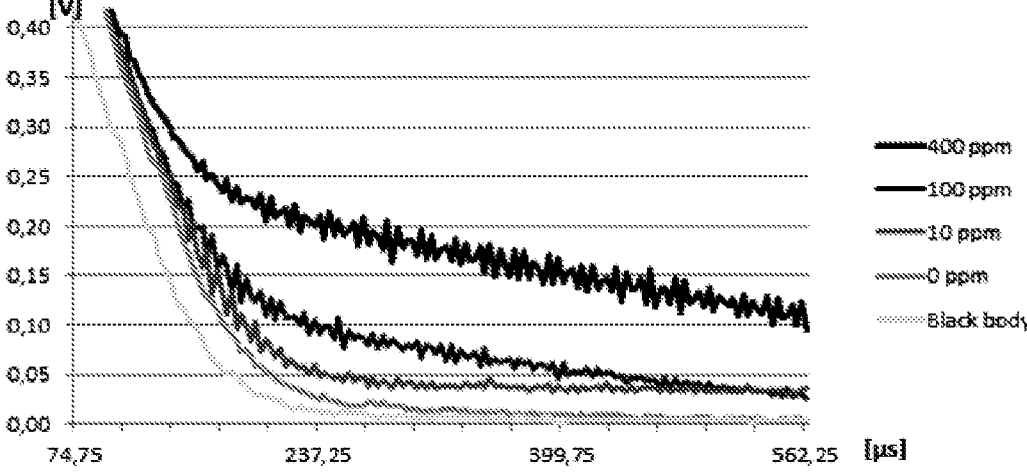
FIG. 10: Illustration of results of LNPs are present with 400 ppm, 100 ppm, 10 ppm, no LNPs and black body.

FIG. 10 shows the results got from embodiment with one OP-AMP logarithm circuit and second stage OP-AMP circuit for a given LNP with 10 ppm concentration.

Figure 11:
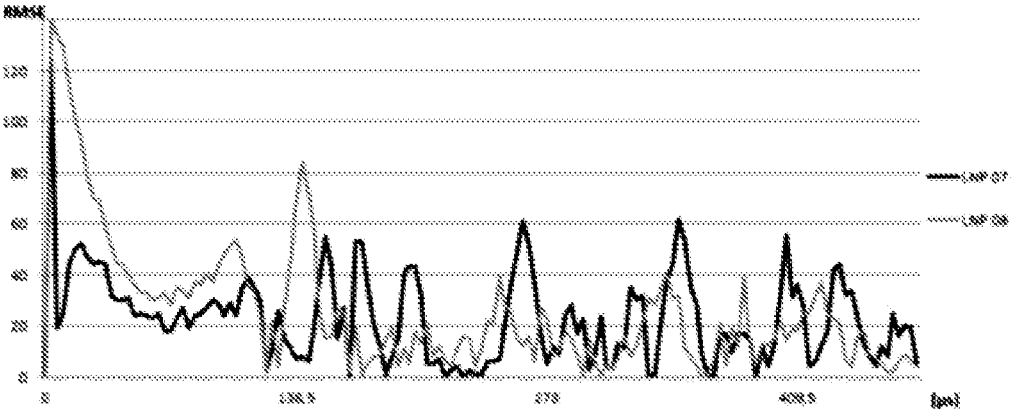
FIG. 11: Illustration of results of from embodiment with two different photodiodes sensors, for a set of substrates, where LNP07 and LNP08 are present in different sets of concentrations. Graphic is showing the Root Mean Square Deviation of difference between photodiodes signals, function in time.

FIG. 11 shows the results got from embodiment with two different photodiodes sensors, for a set of substrates, where LNP07 and LNP08 are present in different sets of concentrations. Graphic is showing the Root Mean Square Deviation of difference between photodiodes signals, function in time.

Figure 12:
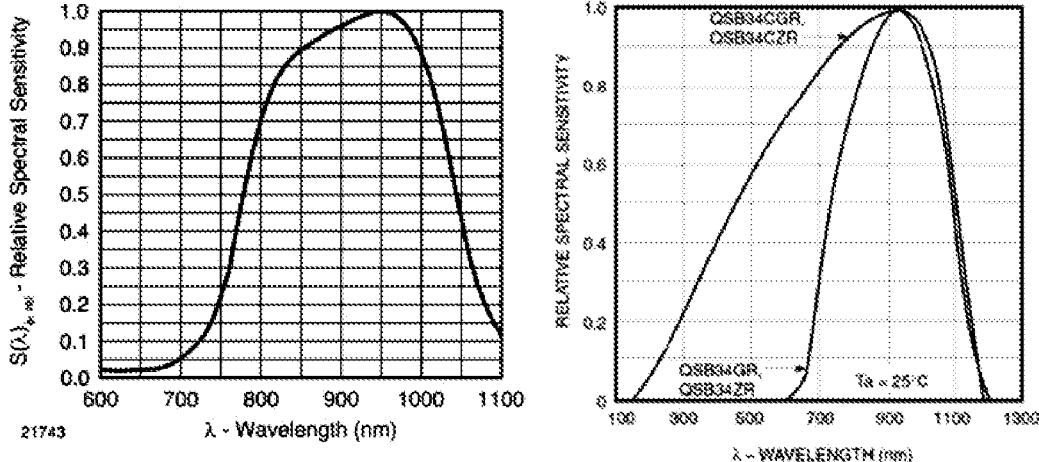
FIG. 12: shows the illustration of the wavelength spectral response of two different photodiodes of different suppliers.

FIG. 12 shows the Illustration of the wavelength spectral response of two different photodiodes of different suppliers.

Due to small amount of energy received from LNPs the enclosure rip and cavity will work as a dark chamber where an acrylic glass is placed on front. This acrylic glass has the function to protect emitters and sensors against dust and dirty, also is used for visible light cut filter. Dimensions are playing with direction and angle of incident light beam on substrate and respective reflective energy traveling back to the photodiode sensor. The sensor will have also an optimum angle and optimum direction where maximises the converted of received energy to electrical signal.

The sensor electrical signal needs to be amplified and accommodate to ADC levels enabling to be analysed. It is disclosing the use of a logarithm OP-AMP based circuit giving a large amplification for small signals. Additionally, a second stage of a linear amplification, on output of logarithm OP-AMP based circuit, is used to increase more sensitivity.

Due of high level of sensitivity, it is very important to avoid environment common light to reached photodiodes. A true dark chamber is mandatory but not enough, light pass through the rip enclosure of the apparatus and only IR or UV light belonging to LEDs and LNPs emission. Enclosure has a flat surface where acrylic filter is completed align and without any gaps allowing a perfect contact with substrates. Apparatus is put down on a given substrate and before the illumination of substrate with IR or UV light, the dark level is measured. Under such conditions, if the photodiodes receive a level of signal over what was defined for the limit, the user is informed for the fact giving the chance to move apparatus for a better position. The process of a data acquisition is going to start by ADC where DAC level goes to maximum level of IR or UV light and loops decreasing intensity step by step. The signal obtained need to have a form as FIG. 9 allowing apparatus to be used for identification and quantification. Understanding the term identification as recognition of a given LNP presented in substrate and the term quantification the concentration of LNPs in substrate.

Software algorithms for the purposed are implemented in DSP where results are transmitted through an external communication channel: USB, Bluetooth, WiFi, among other possibilities. In all embodiments in which software algorithms are employed, they are implemented using code that executes within a hardware processor.

In a possible implementation scenario, identification and quantification values are stored in a remote storage infrastructure: database or block-chain. The preferable embodiment, apparatus is connected using a USB cable with an external device as smartphone, tablet or even a computer. This external unit, by user request, starts an acquisition informing apparatus for location, date and time. The apparatus receiving such information from external device creates then a package information with identification and quantification parameters added by location, date and time. In the end, send package information to remote storage infrastructure.

On the electronic circuit, each photodiode is inversed polarised where signal is amplified by independent OP-AMP logarithm-based circuit connected to different ADC's channels. One of photodiode used VBP104FAS from Vishay Semiconductors which has a good response to infra-red light. Similar devices with different spectral response are use from others manufactures such as OSRAM, ON SEMICONDUCTOR among others.

Infra-red or ultraviolet emitters are driven by an ON-OFF circuit together with OP-AMP connected to DAC enabling to control current circuit varying light intensity. The IR LED's drive is power supply by a constant current circuit. The infra-red emitters are LED base component with high power and narrow beam from OSRAM Opto Semiconductors, reference SFH4640 where, according with manufacture, radiant intensity can reach 1050 mW/sr. A microcontroller is used to adequate infra-red or ultraviolet light to medium and acquiring data for post processing.

The preferable embodiment by using a DAC output from a microcontroller, can adjust the intensity of infra-red light and also controlling signal format. With these intensity and time control the apparatus can adequate or tune IR or UV LEDs to the observed substrate taking the maximum level of reflect energy from LNPs and avoids photodiodes sensors saturation. Doing this light control, a tune process, apparatus increases the range of detection special for high concentration of LNPs. Moreover, light control is in regard to control circuitry that is configured, such as a processor executing code that has start and end parameters the define a window of time in which LNP detection is performed, for instance, to ensure that detection of LNPs is performed after receiver obfuscation has subsided/concluded and such performance is before the signal is quenched by the material under observation.

After shut off of IR or UV light the LNPs return energy is decreasing with a giving constant of time and following a natural negative exponential. The photodiode sensor is amplified by a logarithm OP-AMP circuit where the result, input signal in ADC, is a line, function of time where the slope is directly proportional to the decay time of LNP.

Quantification of a given substrate with LNPs, number of particles per square centimetre detected by sensor, is related to the time when light energy reaches the dark level.

Substrates with small amount of LNPs, e.g. 10 ppm, the return signal will be very weak. Adding a second stage of amplification signals can be observed and used for identification and quantification. However, this circuit is saturated for higher concentrations. This is the reason to have both signals, output from logarithm OP-AMP and output from second stage of amplification, entering in different ADCs channels, giving the possibility to process different levels of LNPs concentration.

For identification, it is possible by using the difference between signals from sensors. Since, photodiodes are different with different wavelength spectral response, there will be obtained different signals. Obtaining Computing the Root Mean Square Deviation of each point of time signals, it is possible to characterise and associate each LNP for a given signature.

It is disclosed an apparatus comprising a dark chamber enclosure for recognising infrared, IR, and ultraviolet, UV, reactive luminescent nano-particles in a substrate using a set of sensors, said device comprising: one or more IR or UV illuminators for illuminating the luminescent nano-particles; a rip to allow light pass through; a drive based on constant current source; set of sensors based on photodiodes; a set of logarithm amplifiers OP-AMP based; a microcontroller with several ADC input channels and DAC output; wherein all photodiodes are different in terms of spectral sensitivity response; wherein all photodiodes has independent logarithm amplifiers circuits; wherein all independent photodiodes logarithm amplifiers signal are connected to different microcontroller ADC input channels; wherein IR or UV illuminators drive is controlled by a DAC microcontroller signal.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

The invention claimed is:

1. A device for detecting reactive luminescent nano- or micro-particles embedded in a composite comprising a polymeric matrix with carbon-black or sulphur-black particles, or embedded in a sulphur-dyed substrate or surface, comprising:

an infrared (IR) or ultraviolet (UV) illuminator for illuminating the luminescent particles;

a near-infrared photodiode sensor for capturing a near-infrared response of the illuminated luminescent particles;

a dark chamber for placing over the substrate or surface, inside which the illuminator and photodiode sensor are mounted;

a logarithm amplifier for amplifying and linearizing a response signal captured by the photodiode sensor;

an electronic data processor configured for detecting the reactive luminescent particles, by carrying out the steps of:

illuminating the composite comprising the polymeric matrix with carbon-black or sulphur-black particles, or the sulphur-dyed substrate or surface, with the illuminator;

acquiring, from the logarithm amplifier, the amplified linearized signal captured by the photodiode sensor; and detecting the presence of the luminescent particles in the composite comprising the polymeric matrix with carbon-black or sulphur-black particles, or in the sulphur-dyed substrate or surface, from the linearized decay of the acquired signal.

2. The device according to claim 1, wherein the processor is further configured to monitor the amplified linearized signal captured by the photodiode sensor and to commence the acquiring step only at a time after a photodiode sensor obfuscation in the monitored signal has subsided or concluded.

3. The device according to claim 1, wherein the processor is further configured to monitor the amplified linearized signal captured by the photodiode sensor and to terminate the acquiring step only at a time when a predetermined photodiode sensor signal level in the monitored signal has been reached.

4. The device according to claim 1, wherein said device comprises a further near-infrared photodiode sensor with a different spectral sensitivity response from the first photodiode sensor, a further logarithm amplifier for amplifying and linearizing a signal received by the further photodiode sensor, and a differentiator for obtaining a difference between amplified signals received by each photodiode sensor, and wherein the electronic data processor is configured for detecting peaks in a time-domain signal of said difference above a predetermined threshold.

5. The device according to claim 4, wherein the electronic data processor is configured for distinguishing between luminescent particles having a different spectral response from the detected peaks.

6. The device according to claim 1, wherein said device comprises a linear amplifier for further amplifying the amplified linearized signal captured by each photodiode sensor.

7. The device according to claim 1, wherein said IR illuminator is a LED IR illuminator or laser IR illuminator and/or said UV illuminator is a LED UV illuminator or laser UV illuminator.

8. The device according to claim 1, wherein the substrate is a textile substrate, a paper substrate, a plastic substrate, a metal substrate, a cork substrate, a wood substrate, a leather substrate, a fur substrate, or combinations thereof.

9. The device according to claim 1, wherein the logarithm amplifier is an OP-AMP logarithm amplifier.

10. The device according to claim 1, wherein the reactive luminescent nano- or micro-particles comprise a core of rare earth ceramic material selected from a group of $La^{3+}$; $Ce^{3+}$, $Pr^{3+}$, $Nd^{3+}$; $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, or combinations thereof.

11. A computer-based method for detecting reactive luminescent nano- or micro-particles embedded in a composite comprising a polymeric matrix with carbon-black or sulphur-black particles, or embedded in a sulphur-dyed substrate or surface, comprising the steps of:

illuminating the composite comprising the polymeric matrix with carbon-black or sulphur-black particles, or the sulphur-dyed substrate or surface, with an infrared or ultraviolet illuminator for illuminating the luminescent particles;

capturing a near-infrared response of the illuminated luminescent nano-particles with a near-infrared photodiode sensor, wherein the illuminator and photodiode sensor are mounted inside a dark chamber placed over the composite comprising the polymeric matrix with carbon-black or sulphur-black particles, or over the sulphur-dyed substrate or surface;

amplifying and linearizing the response signal captured by the photodiode sensor with a logarithm amplifier;

acquiring the amplified linearized signal captured by the photodiode sensor;

detecting the presence of the luminescent nano- or micro-particles in the composite comprising the polymeric matrix with carbon-black or sulphur-black particles, or in the sulphur-dyed substrate or surface, from the linearized decay of the acquired signal.

12. The method according to the claim 11, comprising the steps of:

amplifying and linearizing, by a further logarithm amplifier, a signal received by a further near-infrared photodiode sensor with a different spectral sensitivity response from the first photodiode sensor;

obtaining a difference, by a differentiator, between amplified signals received by each photodiode sensor.

13. The method according to claim 12, comprising the step of detecting peaks in a time-domain signal of said difference above a predetermined threshold.

14. The method according to claim 13, comprising the step of distinguishing between luminescent particles having a different spectral response from the detected peaks.

15. The method according to claim 11, wherein said method comprises using a device which comprises a linear amplifier for further amplifying the amplified linearized signal captured by each photodiode sensor.

16. The method according to claim 11, wherein said the logarithm amplifier is an OP-AMP logarithm amplifier.

17. The method according to claim 11, wherein the substrate is a textile substrate, a paper substrate, a plastic substrate, a metal substrate, a cork substrate, a wood substrate, a leather substrate, a fur substrate, or combinations thereof.

18. The method according to claim 11, wherein the reactive luminescent nano- or micro-particles comprise a core of rare earth ceramic material selected from a group of $La^{3+}$; $Ce^{3+}$, $Pr^{3+}$, $Nd^{3+}$; $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, or combinations thereof.

19. A non-transitory storage medium including program instructions for implementing a computer-based method for detecting a reactive luminescent nano-particles in a composite or substrate or surface, the program instructions including instructions which when executed by a data processor cause it to carry out the method of claim 11.

20. A kit comprising a product comprising reactive luminescent nano- or micro-particles embedded in a composite comprising a polymeric matrix with carbon-black or sulphur-black particles, or reactive luminescent nano- or micro-particles embedded in a sulphur-dyed substrate or surface, said kit further comprising the device according to claim 1.

* * * * *